W. A. OSLEY.
HOSE BAND.
APPLICATION FILED AUG. 15, 1917.

1,268,761.

Patented June 4, 1918.

WITNESS:
A. C. Fairbanks

INVENTOR.
Willard A. Osley,
BY
Frank A. Cutter,
ATTORNEY.

UNITED STATES PATENT OFFICE.

WILLARD A. OSLEY, OF SPRINGFIELD, MASSACHUSETTS.

HOSE-BAND.

1,268,761.  Specification of Letters Patent.  Patented June 4, 1918.

Application filed August 15, 1917. Serial No. 186,347.

*To all whom it may concern:*

Be it known that I, WILLARD A. OSLEY, a citizen of the United States of America, and a resident of Springfield, in the county of Hampden and State of Massachusetts, have invented a new and useful Hose-Band, of which the following is a specification.

My invention relates to improvements in protective and anti-friction devices designed to be attached to hose at intervals on the outside, and consists of a flexible, tubular member, preferably a coiled spring, partially to encircle the hose, a flexible, tubular member, also a coiled spring by preference, to fit into and connect the ends of said first-named member and thus close the space between such ends, and a flexible and pliable binding member, a piece of annealed wire generally being employed, for said tubular members and through the interior of which members said binding member passes circumferentially, as hereinafter set forth.

Large and heavy hose which has to be dragged about on the floor with greater or less frequency, such as that employed with vacuum-cleaner systems in large buildings, is difficult to handle and soon wears out, owing to the friction between the hose and the floor, and the primary object of my invention is to provide a band for such hose, which raises said hose from the floor and so prevents wear, and at the same time reduces the frictional resistance so that it is very much easier to move the hose about. It will be understood that several of my bands are applied in spaced relationship to each hose, the distance apart of such bands depending upon the conditions to be met and overcome.

Another object is to provide such a band which is simple and inexpensive, can be applied readily, and is strong and durable.

Other objects and advantages will appear in the course of the following description.

I attain the objects and secure the advantages of my invention by the means illustrated in the accompanying drawings, in which—

Figure 1:
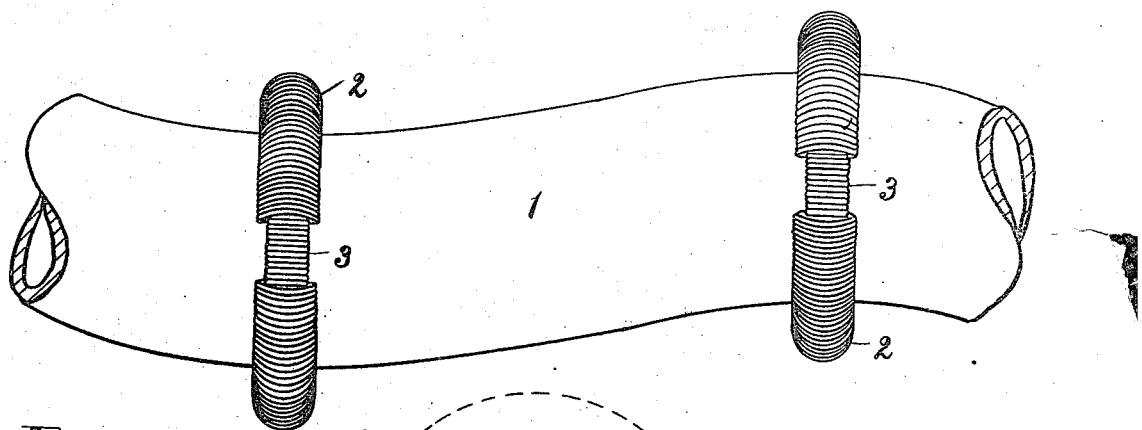
Figure 2:
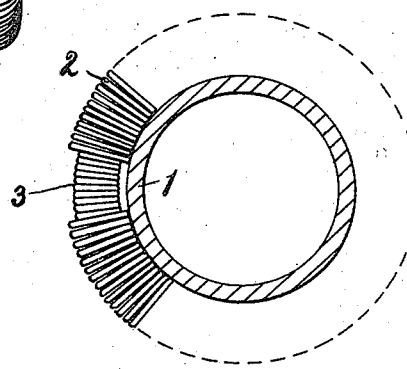
Figure 3:
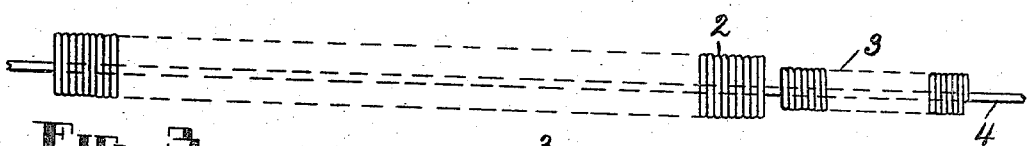

Figure 1 is an elevation of a short section of hose having two bands applied thereto which embody a practical form of my invention; Fig. 2, a cross section through said hose looking against one of said bands; Fig. 3, an elevation of the several elements which enter into the formation of the band, and, Fig. 4, an enlarged, sectional detail of the jointed portion of the band, showing the manner in which the band is secured to the hose and the joint covered.

Similar reference characters designate similar parts throughout the several views.

A short section of hose is represented at 1. This hose may be of any length and have attached thereto as many of my bands as may be deemed necessary, such bands being arranged at intervals which are reasonable distances apart. The bands encircle the hose 1 and support the same from the floor, so that said hose does not come into contact with said floor and is not worn by reason of such contact. Furthermore, the bands are narrow and circular in both directions, and therefore present only small contacting surfaces to the floor and offer very little frictional resistance as the hose is dragged along or moved about on the floor.

Each band consists of a large spiral spring 2 which is of insufficient length entirely to encircle the hose 1, the ends of such spring falling short of each other by three-quarters of an inch, more or less; a short, spiral, coupling spring 3, the external diameter of which is approximately equal to the internal diameter of said first-named spring; and a wire 4 which encircles the said two springs inside and binds them securely to the hose.

Both ends of the wire of which the spring 2 is made are cut off on the same side, as shown at 5—5 in Fig. 3. This is done in order that the ends 5 can both be located next to the hose 1, when the spring 2 is attached to said hose, so that neither of such ends will be in position to come into contact with and scratch the floor, or catch on any object, as said hose is drawn along or moved about from place to place.

Figure 4:
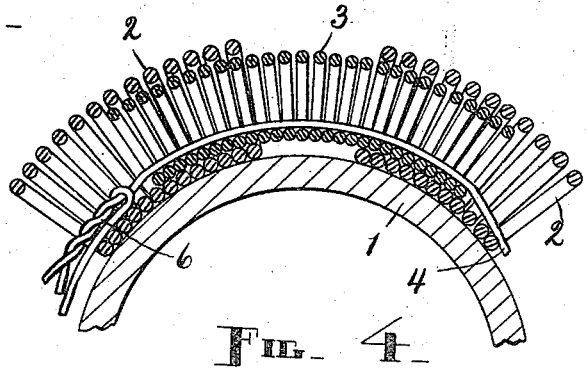

The wire 4 is annealed so that it is ductile, and the ends of said wire are twisted together and the twisted parts bent over onto the adjacent portion of the wire on one side of the joint, as shown at 6 in Fig. 4.

The manner in which each band is applied to the hose 1 is described as follows:

The springs 2 and 3 are first strung on the wire 4, which has been cut to the proper length, said spring 3 is worked far enough into the adjacent end of said spring 2 to leave room, between the other end of said spring 2 and the protruding end of said spring 3, for the protruding terminals of said wire and in which to twist the latter together and bend down the twisted parts in making the joint or tie 6, and the parts are clasped around the hose 1. Then the wire 4 is drawn tight, the ends thereof are fastened together by twisting, any excess portions of such ends are cut off, the tie 6 thus formed is laid down alongside of an adjacent portion of said wire, and the latter is forced around until said tie is located in the terminal of the spring 2 that is opposite to that from which the spring 3 protrudes. And finally the spring 3 is worked along the wire 4 and across the gap between the ends of the spring 2, until such gap is closed and practically filled by said spring 3 and the latter has a bearing at both ends in the end portions of said spring 2, said spring 3 being of sufficient length for the purpose. The wire 4 now holds the spring 2 tightly in contact with the hose and the spring 3 tightly in contact with said first-named spring, and there is a practically continuous, raised support all around the hose. The coupling formed by the spring 3 is preferably located on top of the hose, but even should the same be on the bottom it would make no material difference. The spring 2 is caused to grip the hose so tightly that it is not liable to roll or move circumferentially thereon.

Although the embodiment herein illustrated and described of my invention is a practical and possibly a preferred form of said invention, it is conceivable that changes in the shape, size, and material, and even in the construction, of some or all of the parts of the band may be made, without exceeding the scope of my claims. In this connection it may be remarked that the size of the band and its parts must be changed in order to accommodate the same to different sizes in diameter of hose.

Common wire-cutting pliers is the only tool needed with which to fasten these bands to the hose.

The bands on the hose in Fig. 1 of the drawings are nearer together than they ordinarily need to be in actual practice.

What I claim as my invention, and desire to secure by Letters Patent, is—

1. A hose band comprising telescoping encircling members for a hose, and means to secure such members to said hose, said band being adapted to protect the hose.

2. A hose band comprising telescoping encircling members for a hose, and means to secure such members to said hose, said securing means being wholly within said encircling members.

3. A hose band comprising telescoping encircling members for a hose, and an encircling member to secure such first-named members to said hose, said last-named member being entirely within said first-named members.

4. A hose band comprising a tubular member adapted partially to encircle a hose, a tubular member adapted to engage the ends of said first-named member and substantially fill the space between, and an encircling binding member within said tubular members.

5. A hose band comprising a flexible tubular member adapted partially to encircle a hose, a flexible tubular member adapted to engage the ends of said first-named member and substantially fill the space between, and a flexible and pliable, encircling and binding member within said tubular members.

6. A hose band comprising a spiral spring adapted partially to encircle a hose, a short spiral spring adapted to have its ends inserted in the ends of said first-named spring and substantially fill the space between said last-named ends, and a wire adapted to be passed through said springs, drawn tight, and have its ends secured, the joint thus formed in said wire being hidden by said springs.

7. A hose band comprising a spiral spring adapted partially to encircle a hose, sufficient space being left between the ends of said spring to tie the ends of a wire passed through said spring, a short spring insertible in said first-named spring, and adapted to be moved into position substantially to close said space, and a wire adapted to be passed through said springs, drawn tight, and have its ends secured before said short spring is moved to close said space, the tie formed in said wire being hidden by said springs.

8. A hose band comprising a spiral spring having both ends of the wire, of which such spring is made, on the same side with each other, a short spiral spring adapted to have its ends inserted in the ends of said first-named spring and substantially fill any space that may exist between said last-named ends, and a wire adapted to be passed through said springs, drawn tight, and have its ends secured, the joint thus formed in said last-named wire being hidden by said springs.

WILLARD A. OSLEY.

Witnesses:
F. A. CUTTER,
A. C. FAIRBANKS.